(12) United States Patent
Rajagopalan

(10) Patent No.: US 7,787,470 B2
(45) Date of Patent: *Aug. 31, 2010

(54) DYNAMIC QUALITY OF SERVICE (QOS) PROVISIONING USING SESSION INITIATION PROTOCOL (SIP) MODULE IN WIRELESS BASE STATIONS

(75) Inventor: Bala Rajagopalan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 748 days.

This patent is subject to a terminal disclaimer.

(21) Appl. No.: 11/303,163

(22) Filed: Dec. 15, 2005

(65) Prior Publication Data

US 2007/0140169 A1 Jun. 21, 2007

(51) Int. Cl.
*H04L 12/28* (2006.01)
*H04J 3/16* (2006.01)
(52) U.S. Cl. .................. 370/395.21; 370/468
(58) Field of Classification Search .................. None
See application file for complete search history.

(56) References Cited

U.S. PATENT DOCUMENTS

| 7,042,856 | B2* | 5/2006 | Walton et al. ............... 370/329 |
| 7,200,139 | B1* | 4/2007 | Chu et al. .................. 370/352 |
| 7,254,137 | B2* | 8/2007 | Civanlar et al. ............. 370/401 |
| 2002/0191593 | A1* | 12/2002 | O'Neill et al. .............. 370/352 |
| 2003/0093526 | A1* | 5/2003 | Nandagopalan et al. ...... 709/225 |
| 2004/0193725 | A1* | 9/2004 | Costa-Requena et al. ... 709/238 |
| 2006/0009232 | A1* | 1/2006 | Vakil et al. .................. 455/453 |
| 2006/0056351 | A1* | 3/2006 | Wall .......................... 370/331 |
| 2006/0083193 | A1* | 4/2006 | Womack et al. ............. 370/328 |
| 2006/0111098 | A1* | 5/2006 | Abdel-Kader et al. ........ 455/421 |
| 2006/0114885 | A1* | 6/2006 | Baek et al. .................. 370/352 |
| 2006/0146792 | A1* | 7/2006 | Ramachandran et al. .... 370/352 |
| 2006/0286984 | A1* | 12/2006 | Bonner ....................... 455/445 |
| 2007/0064948 | A1* | 3/2007 | Tsirtsis et al. ............... 380/270 |
| 2007/0189266 | A1* | 8/2007 | Izumi et al. ................. 370/352 |
| 2007/0223450 | A1* | 9/2007 | Holmstrom et al. ......... 370/352 |

OTHER PUBLICATIONS

Network Working Group; J. Rosenberg et al. "RFC3261 - SIP Session Initiation Protocol" http://www.faqs.org/rfcs/rfc3261.html. The Internet Society 2002.

* cited by examiner

*Primary Examiner*—Hong Cho
*Assistant Examiner*—Eunsook Choi
(74) *Attorney, Agent, or Firm*—Pearl Cohen Zedek Latzer, LLP

(57) ABSTRACT

A method, apparatus and/or system for communicating in a wireless network may dynamically create and/or delete a medium access control (MAC) quality of service (QoS) connection in a wireless link between a base station and a mobile station. Each wireless base station in the network may include a packet classifier to quickly identify packets that may include session initiation protocol (SIP) messages and SIP logic to trigger the MAC QoS connection based on a received SIP message. Various other detailed embodiments and variants are also disclosed.

18 Claims, 5 Drawing Sheets

DYNAMIC QUALITY OF SERVICE (QOS) PROVISIONING USING SESSION INITIATION PROTOCOL (SIP) MODULE IN WIRELESS BASE STATIONS

BACKGROUND OF THE INVENTION.

As more and more types of different services are being made available for devices utilizing wireless networks, it is becoming increasingly important to design a wireless medium's physical layer to effectively handle the requirements of traditionally wired data link layer traffic. Many new generation wireless systems are designed to dynamically create medium access control (MAC) level service flows (or connections) with associated quality of service (QoS) requirements.

However, there is an ongoing need to provide suitable mechanisms for Internet Protocol (IP) -based applications to trigger the creation of these MAC connections with the appropriate QoS level on demand.

BRIEF DESCRIPTION OF THE DRAWING.

Aspects, features and advantages of embodiments of the present invention will become apparent from the following description of the invention in reference to the appended drawing in which like numerals denote like elements and in which.

DETAILED DESCRIPTION OF THE INVENTION.

While the following detailed description may describe example embodiments of the present invention in relation to broadband wireless networks such as WiMAX (an acronym that stands for Worldwide Interoperability for Microwave Access) or EVDO (Evolution Data Only) networks, the inventive embodiments may be applicable to any type of wireless metropolitan area network (WMAN) where similar advantages may be obtained. Additionally, the inventive embodiments are not limited to WMANs and may relate to, if applicable, wireless local area networks (WLANs), wireless personal area networks (WPANs) and/or wireless wide area networks (WWANs) such a cellular networks and the like. Further, while specific embodiments may be described in reference to wireless networks utilizing Orthogonal Frequency Division Multiplexing (OFDM) and/or Orthogonal Frequency Division Multiple Access (OFDMA) modulation, the embodiments of present invention are not limited thereto and, for example, can be implemented using other modulation and/or coding schemes where suitably applicable.

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, fixed user stations, mobile stations, base stations, access points (APs), hybrid coordinators (HCs), gateways, bridges, hubs, routers and other network peripherals. Further, the radio systems within the scope of the invention may include cellular radiotelephone systems, satellite systems, personal communication systems (PCS), two-way radio systems and two-way pagers as well as computing devices including such radio systems such as personal computers (PCs) and related peripherals, personal digital assistants (PDAs), personal computing accessories, hand-held communication devices and all existing and future arising systems which may be related in nature and to which the principles of the inventive embodiments could be suitably applied.

Figure 1:
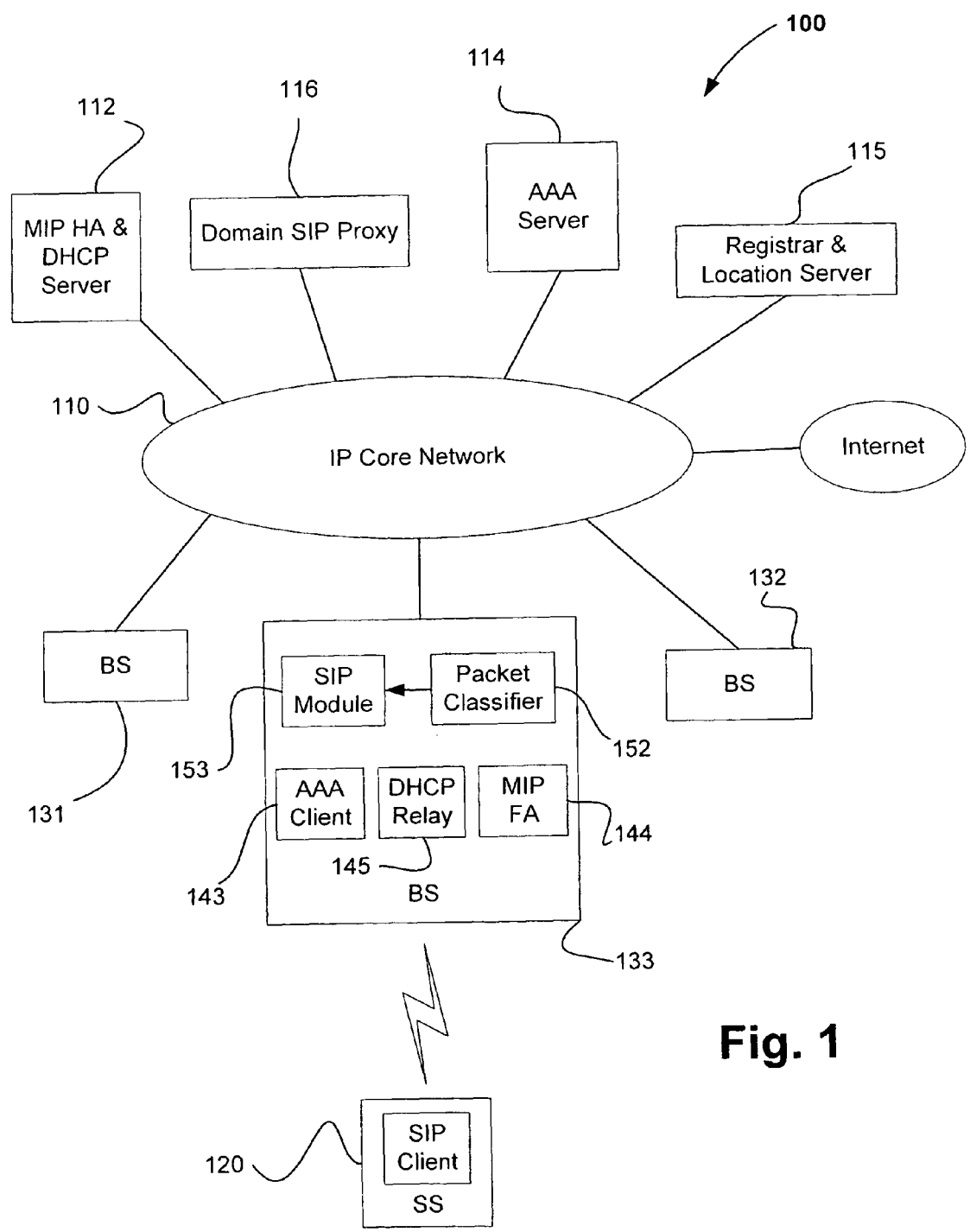
FIG. 1 is block diagram of an example wireless network according to various embodiments.

Turning to FIG. 1, a wireless communication network 100 according to various inventive embodiments may be any system capable of facilitating wireless access between, and or including, a core network 110 and one or more user stations 120 (also referred to as subscriber stations). For example in one embodiment, network 100 may include a one or more base stations (BS) 131, 132, 133 that facilitate wireless communication between core network 110 and subscriber station 120. In example implementations the wireless communication may use protocols such as those contemplated by various 802.16 standards specified by the Institute of Electrical and Electronics Engineers (IEEE) for fixed and/or mobile subscribers, although the inventive embodiments are not limited in this respect.

In the example configuration of FIG. 1, base stations 131, 132, 133 serve as managing entities that control the wireless communication between subscriber stations (or client stations) 120 and provider network 110.

In one example implementation, base stations 131, 132, 133 are connected to a core network (e.g., an Internet Protocol (IP) network) 110. When subscriber station 120 is executing an application (collectively or individually referred to as a client) that may require a certain level of QoS to be supported in the wireless link, a triggering mechanism may be used for the serving base station (e.g., BS 133) to dynamically create or adapt the wireless link between base station 133 and subscriber station 120 with the appropriate QoS requirements (e.g., bandwidth, priority, etc.). Several potential triggering mechanisms could be used and may be broadly classified into two general categories: (i) implicit triggers and (ii) explicit triggers.

With implicit triggers, the base station 133 and/or a subscriber station 120 may monitor application traffic to deduce when MAC connections (with a required QoS) should be created. However, this may require the base station or subscriber station to thoroughly inspect every IP packet and/or use sophisticated logic to determine when to create and/or delete connections. This approach may pose significant overhead and may not particularly suitable for subscriber station implementations. However, this approach does not require any changes to existing applications and/or their behavior.

For implicit triggers, there are essentially two ways of realizing the trigger. First, an application programming interface (API) may be developed that allows IP-based applications to explicitly request QoS connections of the wireless network. However, this approach requires applications to be designed specifically to utilize the new API and thus existing applications may not be supported. Second, a server in the network that processes application-level control messages can signal to the base station to create MAC connections with appropriate QoS on demand. This approach does not require a new API to be developed in the subscriber station and, if an existing protocol mechanism is used, may be supported by existing and emerging applications.

One such existing protocol mechanism is called Session Initiation Protocol (SIP) and has been used in multi-access wired networks where the end hosts are stationary and the SIP server is customized with specialized protocols for communication with the devices implementing QoS.

SIP is an application-layer control protocol known for use in Internet telephony. SIP can be used to establish sessions for features such as audio/videoconferencing, interactive gaming and call forwarding to be deployed over IP networks. However, SIP has not heretofore been used in wireless networks to trigger the dynamic generation of MAC level connections with associated QoS between a base station (e.g., BSs 131, 132, 133) and a mobile station (e.g., client 120). Further, due to the potential for mobile station 120 to be handed off to a new base station (e.g., BS 132) by virtue of its movement in network 100, the use of SIP must be adapted to be able to seamlessly handle potential changes in the base station that is serving client 120.

According to various embodiments, network 100 may include one or more Mobile IP (MIP) home agent (HA), dynamic host configuration protocol (DHCP) and/or authentication, authorization and accounting (AAA) servers 112, 114 although the inventive embodiments are not limited in this respect. Network 100 may also include one or more domain SIP proxies 116 which serve as the entry/egress points of SIP signaling for a service provider's network domain. One or more SIP registrar and location servers 115 may also be included to support the SIP signaling in network 100. While shown separately, it should be recognized that FIG. 1 is illustrated as a functional block diagram as respective servers could be co-located and/or combined as suitably desired. Furthermore, the term "server" is not necessarily intended to designate a free standing device as several functionalities can be implemented as "virtual servers" within a single device.

In one embodiment, base stations 131, 132, 133 in network 100 may implement the wireless physical layer (PHY) and MAC layer logic and control the QoS over the air interface. For example, base station 133 may route IP packets between the radio side (e.g., to and from client 120) and the IP core network 110.

Accordingly, base stations 131, 132, 133 may implement an AAA client 143, a mobile MIP foreign agent (FA) function 144 and/or a DHCP relay 145 as suitably desired. This is a standard architectural model of a WiMAX network, although the inventive embodiments are not limited in this respect, and detailed descriptions of these elements is therefore omitted.

According to one inventive embodiment, each base station 131, 132, 133 may also include packet classifier logic 152 and SIP logic 153 (also referred to as a SIP module). Packet classifier 152 may function to recognize packets passing through the base station which originate from or destined to any domain SIP proxy and route these packets to the SIP module 153 in the base station. For example, classifier 152 may recognize the IP address(es) corresponding to domain SIP proxies in the source of destination fields of the IP packets and forward matching packets its own SIP module 153. Classifier may be any combination of circuitry, processor and/or software (individually or collectively referred to as "logic") to perform this functionality. Further, classification of IP packets is capability already available in certain base station architectures, for example, those implementing WiMAX or other newer generation wireless data technologies.

SIP module 153 functions to process and/or transmit SIP messages and to trigger the base station to dynamically create and delete MAC connections having a specified QoS over a wireless link based on application signaling and local policies for admission control. In one embodiment, SIP module 153 may be a limited, "stateless" SIP message processing module which may be simpler and/or more scalable than using a full SIP proxy. As used in this context, "stateless" means each SIP message is treated independently of others.

Figure 2:
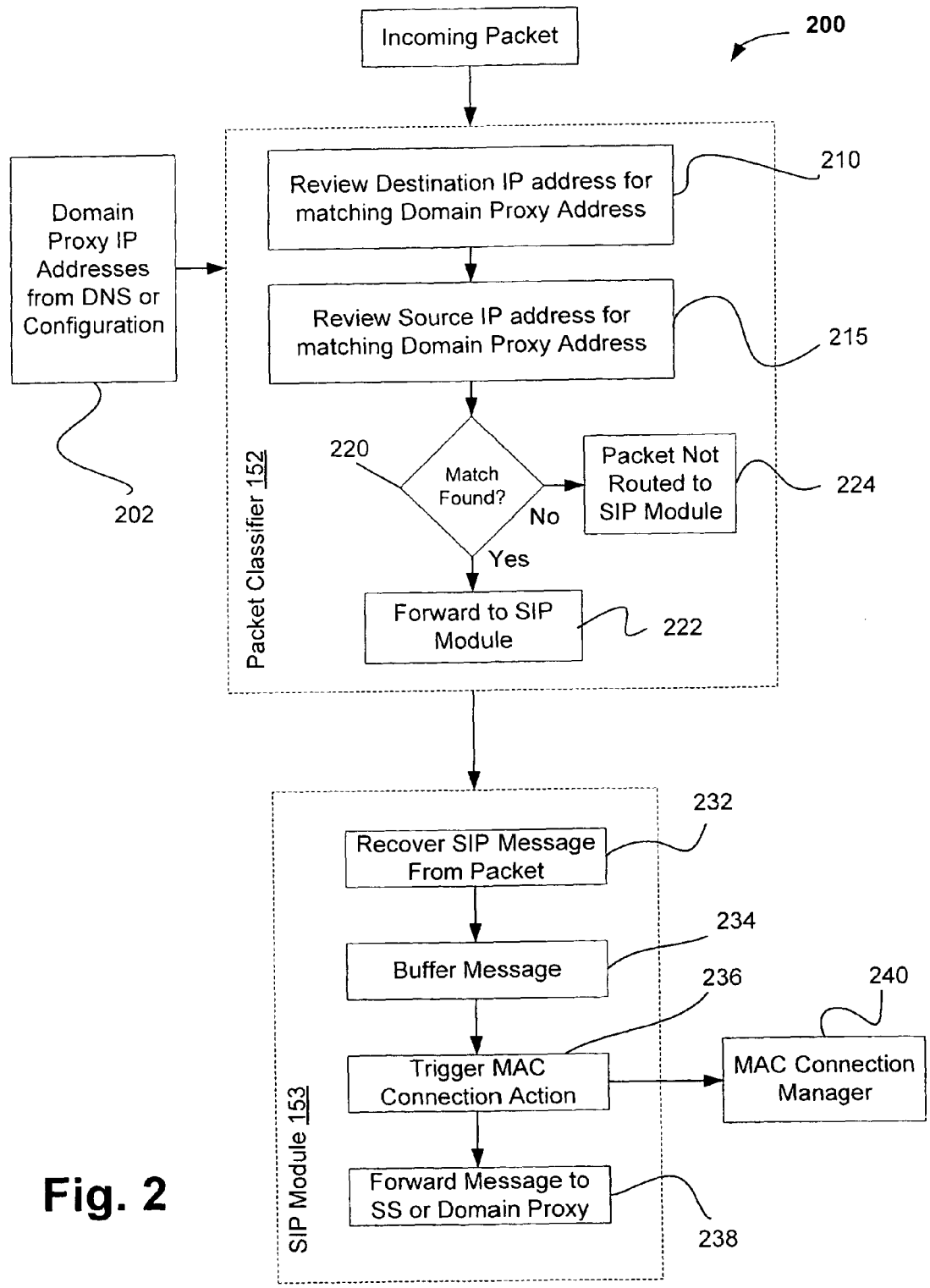
FIG. 2 is a functional block diagram of an example base station of the network of FIG. 1

Turning to FIG. 2, a process 200 for base station 133 to handle packets and dynamically build a MAC connection with required QoS parameters is shown. In this example, an important requirement for base station 133 is to be able to recognize packets originating from or destined to a domain SIP proxy in, for example, network 100 (FIG. 1). Accordingly, each base station may obtain 202 the IP address, protocol and port number used by domain SIP proxies in the network. In one embodiment, this may be performed using a domain name server (DNS) or a configuration file system.

The use of DNS for discovering SIP proxies is described by the Internet Engineering Task Force (IETF) Request For Comments (RFC) 3261 (June 2002) (www.faqs.org/rfcs/rfc3261.html). While the inventive embodiments may adopt this approach, the inventive embodiments are not limited in this manner. Packet classifier 152 in base station 133 may therefore detect IP packets from a client (e.g., subscriber station 120) to a domain SIP proxy simply by looking 210 for a corresponding match in the destination IP address while IP packets in the reverse direction may be identified by looking 215 for a match in the source IP address.

If 220 no address corresponding to a known SIP proxy address is identified, then the packet may be assumed not to include SIP messaging and may be processed 224 accordingly without use of SIP module 153.

However, if 220 a packet having a destination and/or source address corresponding to a known domain SIP proxy is found, it may be forwarded 222 to SIP module 153 for processing. SIP module 153 may then perform a variety of functions depending on the packet received and/or the extent of processing capabilities included in SIP module 153. For example, SIP module 153 may recover 232 the SIP message from the IP packet. Each SIP message typically fits in a single IP packet. However, a message could also be carried in multiple IP packets. Furthermore, a message could be carried using transmission control protocol (TCP) or user datagram protocol (UDP) and IP packets could be retransmitted by the end systems. Therefore, recovering 232 SIP message may involve processing which takes these various factors into account. Recovering 232 a SIP message may include identifying each message and its retransmission properties if any, and determining, if applicable, classification information for the IP layer flow (i.e., including QoS requirements, etc.) which may be desired between the client station and a correspondent SIP-enabled device.

SIP module 153 may also buffer 234 recovered SIP messages and, if applicable, trigger 236 the base station to create, modify and/or delete the MAC connection via the wireless link which supports the QoS level needed for a requested IP layer flow. For example, in one embodiment, the classification information for IP layer flow recovered from the SIP message may be forwarded to a MAC connection manager 240 located in base station 133 although the inventive embodiments are not limited in this respect. This classification information may include, for example, an IP address, port, protocol, and/or other information derived from a recovered SIP message. MAC connection manager 240 may maintain a connection state and corresponding classifiers such that appropriate actions can be taken upon receiving triggers initiated by SIP module 153, thereby allowing the SIP module to be stateless.

SIP module 153 may also forward 238 a recovered SIP message to the subscriber station or domain SIP proxy (e.g., 120, 116; FIG. 1) to which the SIP message is destined.

In this manner, application level SIP signaling can be used to dynamically trigger the creation, modification and/or deletion of MAC flows having the specified QoS attributes over a wireless link. Further, by only inspecting the source and/or destination IP address of a packet, thorough inspection is not required. It should be recognized that FIG. 2 is merely a simplified representation of actions and/or modules for understanding the primary concepts of the inventive embodiments. Practical implementation might take into account various additional factors, such as various potential error conditions and other processes, as suitably desired.

Figure 3:
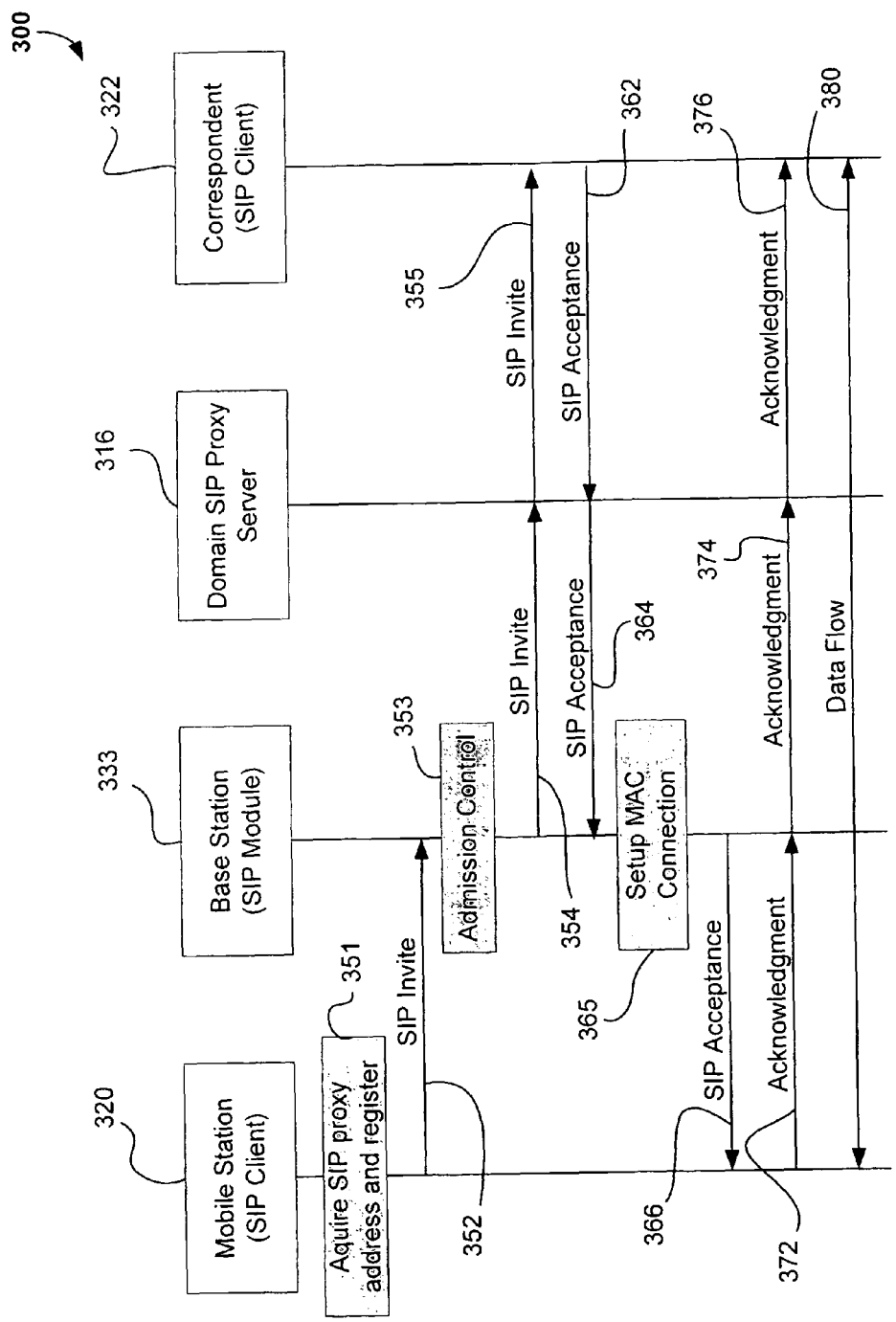
FIG. 3 is a sequence diagram showing a process of communicating in a wireless network according to one embodiment.

Turning to FIG. 3 a message sequencing process 300 is shown for establishing a media flow between a mobile subscriber station 320 running a SIP compatible application and a correspondent SIP client 322 (such as another mobile subscriber station or fixed station). Process 300 may also include messaging that may occur between a base station 333 having an associated SIP module which is serving subscriber station 320 and a network domain SIP proxy server 316.

Process 300 in FIG. 3 is directed to initial establishment of an application service flow by subscriber station 320 which is being serviced by base station 333. Handover to a different base station and/or initiation of the service flow by another correspondent will be discussed subsequently.

Initially, subscriber station 320 running a SIP compatible application (collectively referred to as a SIP client) needs to know an address of a server in the network to send SIP signaling messages and register 351 for the SIP messaging.

This address can be assigned in multiple ways, for instance, via manual configuration in subscriber station 320, using DHCP or DNS. A SIP message sent to the address is received and processed by a domain SIP proxy. Thus, the SIP client in subscriber station 320 need not be aware of the mobility of the subscriber station, but can send SIP messages to an invariant proxy address.

The SIP client 320 may register 351 by sending a REGISTER message (not separately shown) to the domain SIP proxy 316. This message may be detected by the serving base station 333 and forwarded to domain SIP proxy 316, which subsequently may forward the REGISTER message to a centralized SIP Registrar (e.g., server 115; FIG. 1). In one embodiment, the REGISTER message may contain the home address of the subscriber station to be registered in the SIP registrar and location server.

Once registered, a session initiation may follow general SIP procedures and messaging formats per RFC 3261 mentioned previously, although the inventive embodiments are not limited in this manner. For example, the SIP application in the subscriber station 320 may send a SIP INVITE message 352, including call identification, From and To information, to SIP domain proxy 316 via base station 333.

The INVITE message, which is detected by the SIP module in the serving base station 333, may include a session descriptor which may be used by base station 333 to determine if there are adequate resources available to support a data flow associated with the session request and/or whether the configured policies allow the requested flow to be established. This action is generally shown in process 300 as Admission Control 353. If Admission Control 353 fails, then the SIP module may send (not shown) an appropriately formatted SIP message to the subscriber station terminating the session establishment attempt. However, if successfully admitted, base station 333 may reserve the resources required (e.g., as identified by the session descriptor or classifiers from the SIP module) for the admitted session.

In one embodiment, the SIP module of base station 333 may then forward the IP packet(s) containing the INVITE message to the domain SIP proxy server 316. Using established SIP protocols, the base station proxy may send a "Trying" indication (not shown) to the subscriber station SIP client, although the inventive embodiments are not limited in this respect.

The domain SIP proxy server 316 may establish the proper local state and forward 355 the INVITE towards a correspondent SIP client 322, which may or may not occur via additional proxies (not shown). Domain SIP proxy 316 may also send a "Trying" indication (not shown) to the subscriber station SIP client if desired. This message would naturally be detected by the SIP module in base station 333 but may be passed on without any action taken by the SIP module in base station 333.

Correspondent client 322 may send a "Ringing" response (not shown) initially followed by an "OK" or "Accepted" message 362 after the session has been accepted. The accept message may be forwarded 364 by domain proxy 316 and then forwarded 366 by base station 333 to the SIP client at subscriber station 320.

According to one embodiment, once base station SIP module 333 receives the "OK" or "Accepted" message 364 from domain SIP proxy 316, it triggers the creation and/or activation 365 of a MAC connection having the specified QoS parameters between base station 333 and subscriber station client 320 as discussed above, and for which resources were reserved during Admission Control 353.

Depending on the nature of the MAC and or wireless network protocols, setup 365 of the MAC connection might involve the allocation of air link and local buffer resources, establishment of classification rules for the ensuing data flow, and the like. IP layer classifiers from the session descriptor obtained in the original INVITE (or any modifications to the descriptor by the correspondent SIP client) may be used to establish the appropriate QoS parameters.

Finally, an "ACK" message is sent 372 by the SIP client in subscriber station, via 374 the SIP module in base station 333, to domain SIP proxy 316 and forwarded 276 ultimately to correspondent SIP client 322.

Once the MAC connection having the appropriate QoS parameters is established 365, data may flow 380 directly between subscriber station 320 and correspondent client 322. In a preferred embodiment, the various proxies (e.g., domain SIP proxy 216) are not in the data flow path. In one embodiment, Mobile IP forwarding may be used to maintain the data flow as the subscriber station moves between base stations although the inventive embodiments are not limited in this respect.

Although the foregoing embodiment identified specific points where admission control 353 and MAC connection establishment 365 were performed, the inventive embodiments do not exclude other possibilities and or timing.

Figure 4:
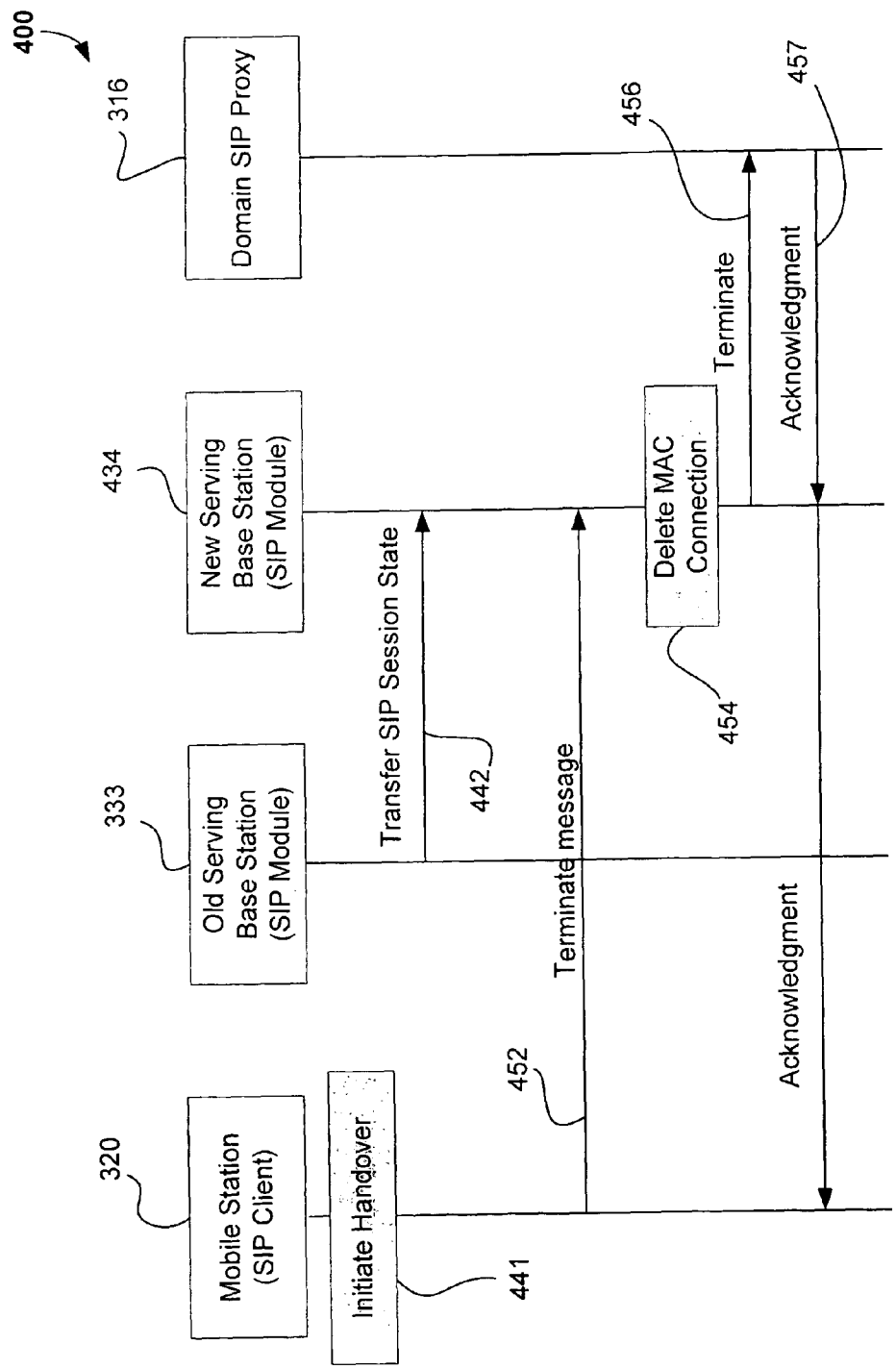
FIG. 4 is a block diagram showing a process of communicating in a wireless network during handoff according to various embodiments of the present invention.

Turning to FIG. 4 a service flow process 400 is shown in the general case where subscriber station 320 moves to a base station 434 different from the previously serving base station 333 and keeps the session established above active.

A handover or handoff procedure may be performed 441 to transfer the air link connection of subscriber station 320 from old serving base station 333 to new serving base station 434. This handover procedure may be initiated by subscriber station 320 or a base station, the specific steps of which will be based on the underlying radio access technology of the network. However, typically a handover involves some interaction between old and new serving base stations 333, 434. Thus, at some point, old serving base station 333 will receive an indication of handover completion from new serving base station 434. At this point, old serving base station 333 may transfer 442 the SIP session state information to new serving base station 434. In a broadband wireless network context, for example using WiMAX protocols, the session state could also be transferred 442 with other context information related to MAC connections. In one embodiment, the session state information may include call identification, the identity of the domain SIP proxy and/or other desired information, for example information as detailed in RFC 3261. The SIP session is then associated with the underlying MAC connection (which was handed over) to new serving base station 434.

The foregoing procedure 400 is completely transparent to SIP client 320, and hence no modifications are necessary to the existing client software or API. Furthermore, the above procedure is also transparent to the domain SIP proxy 216, which can therefore be an off-the-shelf implementation. Consequently, the only entities to be modified to utilize the inventive processes would be the base stations.

FIG. 4 also illustrates an example process for terminating an existing session. In this example, termination of the connection is initiated by the SIP client in subscriber station 320 although the inventive embodiments are not limited in this manner. In this case, SIP client 320 may send 352 a "BYE" or "terminate" message addressed to the domain SIP proxy (which is received by the SIP module in new serving base station 434). This in turn triggers base station 434 to delete 454 the corresponding MAC connection and release any resources previously consumed by the connection. If desired, serving base station 434 may send 456 a "BYE" or "terminate" message to the domain proxy server, which may in turn forward it to the correspondent SIP client via other proxies if present.

Finally, an "ACK" message is sent 457 from the correspondent client via the domain proxy 316 station proxy, which results in the SIP session being terminated. The associated call state may then be deleted at the various proxies and at subscriber station SIP client 320.

The above processes are directed to subscriber station-initiated SIP sessions. However, when a SIP session is to be initiated by a correspondent host and targeted at a mobile subscriber station, some mechanism may be necessary to locate the subscriber station so that SIP messages may be passed to the subscriber station. Accordingly, in one embodiment, mobile IP procedures, which are capabilities already existing in newer generation network architectures, can be used to ensure that IP packets are received by the subscriber station regardless of its location and hence, by the SIP module in the serving base station.

Figure 5:
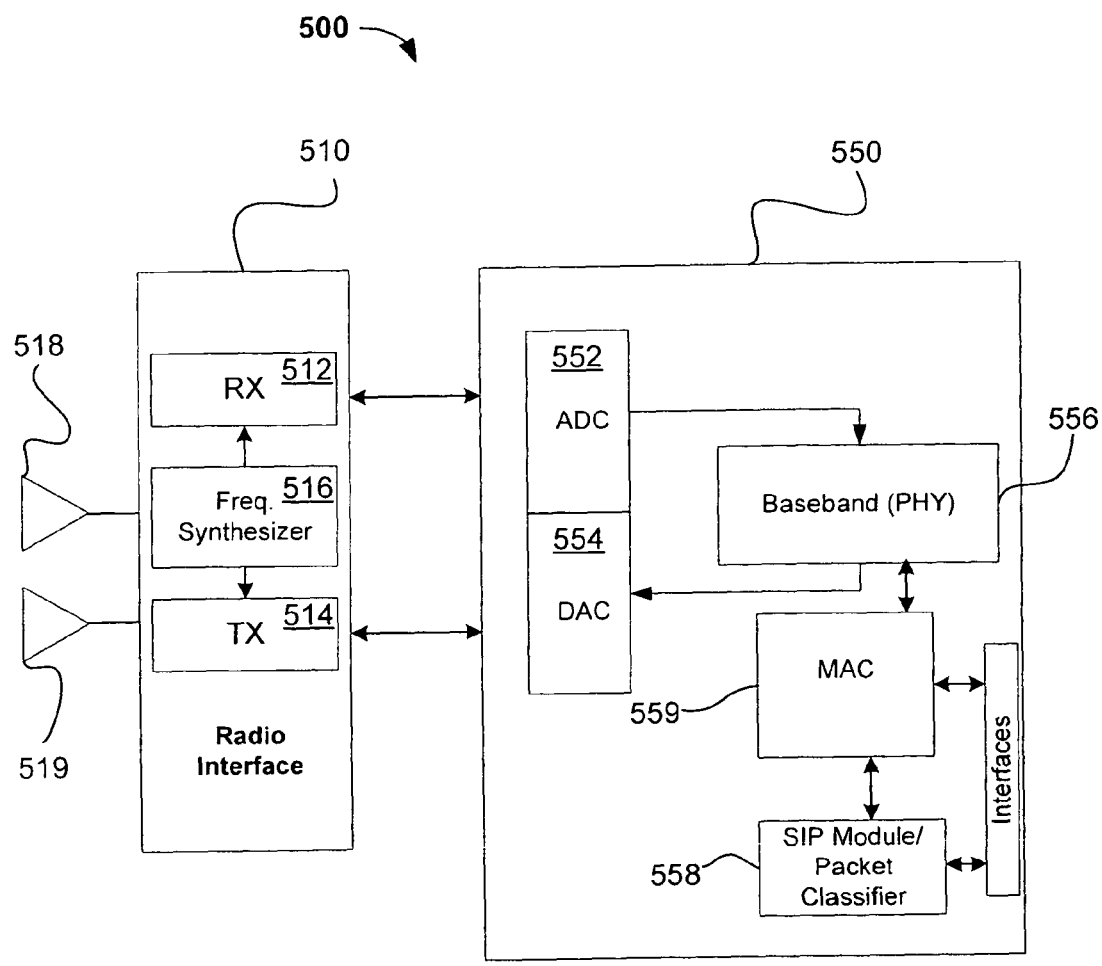
FIG. 5 is a block diagram showing an example wireless base station according to various aspects of the present invention.

Referring to FIG. 5, a base station 500 for use in a wireless network may include a processing circuit 550 including logic (e.g., circuitry, processor and software, or combination thereof) to include the SIP module for triggering the creation of MAC QoS connections as described in one or more of the processes above. In certain embodiments, station 500 may generally include a radio frequency (RF) interface 510 coupled to processing circuit 550.

In one example embodiment, RF interface 510 may be any component or combination of components adapted to send and receive multi-carrier modulated signals (e.g., OFDM) although the inventive embodiments are not limited to any specific over-the-air interface or modulation scheme. RF interface 510 may include, for example, a receiver 512, a transmitter 514 and a frequency synthesizer 516. Interface 510 may also include bias controls, a crystal oscillator and/or one or more antennas 518, 519 if desired. Furthermore, RF interface 510 may alternatively or additionally use external voltage-controlled oscillators (VCOs), surface acoustic wave filters, intermediate frequency (IF) filters and/or radio frequency (RF) filters as desired. Various RF interface designs and their operation are known in the art and the description thereof is therefore omitted.

In some embodiments interface 510 may be configured to be compatible with one or more of the IEEE 802.16 standards contemplated for broadband wireless networks, although the embodiments are not limited in this respect.

Processing portion 550 may communicate with RF interface 510 to process receive/transmit signals and may include, by way of example only, an analog-to-digital converter 552 for digitizing received signals, a digital-to-analog converter 554 for converting digitized signals into analog signals for carrier modulation, and if desired, a baseband processor 556 for physical (PHY) link layer processing of respective receive/transmit signals. Processing portion 550 may also include or be comprised of a processing circuit 559 for medium access control (MAC)/data link layer processing.

In certain embodiments of the present invention, a processor 558 may be included for the base station SIP module and/or packet classifier as discussed above. Alternatively or in addition, baseband processing circuit 556 and/or MAC circuit 559 may share processing for certain of these functions or perform these processes independently. MAC, PHY and/or SIP message processing may also be integrated into a single circuit if desired. In other embodiments, SIP module and/or packet classifier 558 may be external to PHY and MAC processing circuit 550.

Apparatus 500 may be, for example, a base station, a wireless router or NIC and/or network adaptor for computing devices used for example as a wireless mesh point. Accordingly, the previously described functions and/or specific configurations of apparatus 500 could be included, arranged or omitted as suitably desired.

Embodiments of apparatus 500 may be implemented using single input single output (SISO) architectures. However, as shown in FIG. 5, certain preferred implementations may use multiple-input multiple-output (MIMO) architectures having multiple antennas (e.g., 518, 519) for transmission and/or reception. Further, embodiments of the invention may utilize multi-carrier code division multiplexing (MC-CDMA) multi-carrier direct sequence code division multiplexing (MC-DS-CDMA) for OTA link access or any other existing or future arising modulation or multiplexing scheme compatible with the features of the inventive embodiments.

The components and features of station 500 may be implemented using any combination of discrete circuitry, application specific integrated circuits (ASICs), logic gates and/or single chip architectures. Further, the features of apparatus 500 may be implemented using microcontrollers, programmable logic arrays and/or microprocessors or any combination of the foregoing where suitably appropriate (collectively or individually referred to as "logic" or "circuit").

It should be appreciated that the example station 500 shown in the block diagram of FIG. 5 represents only one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

Unless contrary to physical possibility, the inventors envision the methods described herein: (i) may be performed in any sequence and/or in any combination; and (ii) the components of respective embodiments may be combined in any manner.

Although there have been described example embodiments of this novel invention, many variations and modifications are possible without departing from the scope of the invention. Accordingly the inventive embodiments are not limited by the specific disclosure above, but rather should be limited only by the scope of the appended claims and their legal equivalents.

The invention claimed is:

1. A method for communicating in a wireless network comprising:
   receiving at a base station having a first Internet Protocol (IP) address, an IP packet which includes at least a second IP address;
   looking for match of the first with second IP address for detecting a session initiation protocol (SIP) message within the IP packet and based on the match, recovering, by a session initiation protocol (SIP) module of the base station, from said IP packet a SIP message; from the received IP packet and recovering classification information for IP layer flow from the SIP message;
triggering by said SIP module, a dynamic creation and deletion of a medium access control layer (MAC) connection with a specified quality of service (QoS) attribute between said base station and a mobile station over a wireless link according to the recovered SIP message; and
using said classification information for maintaining a connection state and corresponding classifiers.

2. The method of claim 1 wherein the wireless link is a MAC QoS connection which includes a QoS level requested by a SIP-enabled application on said mobile station.

3. The method of claim 1 wherein inspecting is performed by a packet classifier and the method further comprises forwarding the received packet to a SIP module if it does include a corresponding SIP proxy source or destination address.

4. The method of claim 1 comprising sending a SIP session state to a second base station to which the mobile station is handed over.

5. The method of claim 4 wherein the mobile station is handed over to the second base station using mobile Internet Protocol (IP) procedures.

6. The method of claim 1 further comprising storing addresses of one or more domain SIP proxies received from a domain name server (DNS).

7. The method of claim 1 further comprising using a session descriptor in the SIP message to allocate resources for the wireless link.

8. A base station of a wireless communication system, wherein the base station has a first Internet protocol (IP) address, the base station comprising:
a packet classifier to receive an IP packet including a second IP address and to match the first IP address with the second IP address; and
a SIP module operably coupled to said packet classifier to recover based on the match, a SIP message from the received IP packet, to recover classification information from the SIP message and to trigger a dynamic creation and deletion of a medium access control layer (MAC) connection with a specified QoS (quality of service) attribute between said base station and a mobile station over a wireless link based on the recovered SIP message, wherein said classification information is used for maintaining a connection state and corresponding classifiers.

9. The base station of claim 8 wherein the wireless link is initiated by SIP signaling from an application on the mobile station.

10. The base station of claim 8 wherein the packet classifier includes memory to store Internet Protocol (IP) addresses of one or more domain SIP proxies provided by a domain name server (DNS).

11. The base station of claim 8 further comprising a MAC connection manager coupled to the SIP module to generate the wireless link in response to a signal received from the SIP module.

12. The base station of claim 8 wherein the SIP module maintains a SIP session state of the mobile station to be transferred to a new serving base station upon handoff of the mobile station to the new serving base station.

13. A system for wireless communications, the system comprising:
a base station having a first Internet protocol (IP) address wherein the base station comprises:
a processing circuit including classifier logic to receive an IP packet including a second IP address and to match the first IP address with the second IP address; and
a SIP module operably coupled to said classifier logic to recover a SIP message based on the match, from the received IP packet, to recover classification information from the SIP message and to trigger a dynamic creation and deletion of a medium access control layer (MAC) connection with a specified QoS (quality of service) between said base station and a mobile station over a wireless link based on the recovered SIP message, wherein said classification information is used for maintaining a connection state and corresponding classifiers; and
a radio interface circuit operably coupled to the processing circuit, the radio interface including at least two antennas.

14. The system of claim 13 wherein the SIP message is generated by an application in the mobile station.

15. The system of claim 13 further comprising a MAC connection manager in communication with the SIP module to generate the wireless link based on a signal from the SIP module.

16. A processing circuit comprising:
a session initiation protocol (SIP) module; and
a packet classifier module, the SIP module and the packet classifier module to:
receive at a base station having a first Internet Protocol (IP) address, an IP packet;
look for a match of the first IP address with a second IP address for detecting a session initiation protocol (SIP) message within the IP packet and based on the match, recover from said IP packet the SIP message; from the received IP packet and recovering classification information for IP layer flow from the SIP message;
trigger a dynamic creation and deletion of a medium access control layer (MAC) connection with a specified quality of service (QoS) attribute between said base station and a mobile station over a wireless link according to the recovered SIP message; and
use said classification information for maintaining a connection state and corresponding classifiers.

17. The processing circuit of claim 16 wherein the SIP module and the packet classifier module are to:
delete wireless link in response to a second SIP message in a second identified packet.

18. The processing circuit of claim 17 wherein the SIP module and the packet classifier module are to:
transfer a SIP session state in response to a mobile station handoff.

* * * * *